United States Patent
Brown

(10) Patent No.: US 11,132,716 B2
(45) Date of Patent: Sep. 28, 2021

(54) SYSTEM AND METHOD FOR PROMOTING A TALENT OF A USER VIA A WIRELESS NETWORK OF MOBILE CLIENT DEVICES

(71) Applicant: Gavin Washington Brown, Far Rockaway, NY (US)

(72) Inventor: Gavin Washington Brown, Far Rockaway, NY (US)

( * ) Notice: Subject to any disclaimer, the term of this patent is extended or adjusted under 35 U.S.C. 154(b) by 384 days.

(21) Appl. No.: 15/195,179

(22) Filed: Jun. 28, 2016

(65) Prior Publication Data

US 2017/0372374 A1    Dec. 28, 2017

(51) Int. Cl.
*G06Q 30/02* (2012.01)
*H04L 29/08* (2006.01)
*G06Q 50/00* (2012.01)

(52) U.S. Cl.
CPC ..... *G06Q 30/0269* (2013.01); *G06Q 30/0277* (2013.01); *G06Q 50/01* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 7,509,230 B2 | 3/2009 | Fernandez et al. | |
| 8,132,200 B1 * | 3/2012 | Karam | G06F 17/30846 725/13 |
| 8,156,023 B2 | 4/2012 | DePetris et al. | |
| 8,170,904 B1 * | 5/2012 | De Moraes | G06Q 10/101 705/7.29 |
| 9,219,790 B1 * | 12/2015 | Filev | H04N 21/25866 |
| 9,632,972 B1 * | 4/2017 | Moxley | G06Q 30/0269 |

(Continued)

FOREIGN PATENT DOCUMENTS

| | | | | |
|---|---|---|---|---|
| JP | 2001-357232 A * | 1/2000 | | G06Q 30/04 |
| WO | WO 2015/109119 A1 * | 1/2015 | | G06Q 50/10 |
| WO | WO 2016/016752 A1 * | 2/2016 | | G06Q 50/01 |

OTHER PUBLICATIONS

Klout Score: Measuring Influence Across Multiple Social Networks, Rao et al., 2015 IEEE International Conference on Big Data (Big Data).*

(Continued)

*Primary Examiner* — David J Stoltenberg
(74) *Attorney, Agent, or Firm* — Russ Weinzimmer & Associates, P.C.

(57) ABSTRACT

A system is disclosed for promoting a talent of a user. The system includes one or more application servers accessible over a wireless network, and a plurality of mobile clients configured to access the one or more application servers over the wireless network. The application servers and the mobile clients cooperate to execute a profiler mode of operation in which details of talents of profiler users are entered at respective mobile clients and uploaded to the application servers, each of the plurality of profiler users having a corresponding rank. The application servers and mobile clients also cooperate to execute a supporter mode of operation in which supporter users, using respective mobile clients, access the details of the talents and corresponding ranks of the profiler users. The supporter mode of operation facilitates advancement of a profiler user to a higher rank through receipt of endorsements.

17 Claims, 16 Drawing Sheets

(56) References Cited

U.S. PATENT DOCUMENTS

| | | | |
|---|---|---|---|
| 10,282,740 B1* | 5/2019 | Bramwell | G06Q 30/0236 |
| 2002/0099562 A1 | 7/2002 | Bruce, Sr. et al. | |
| 2002/0133386 A1 | 9/2002 | Chishti et al. | |
| 2003/0014318 A1 | 1/2003 | De La Motte et al. | |
| 2007/0179845 A1 | 8/2007 | Jain | |
| 2007/0244570 A1* | 10/2007 | Speiser | G06Q 50/10 700/1 |
| 2007/0244749 A1* | 10/2007 | Speiser | G06Q 30/0212 705/14.14 |
| 2008/0000970 A1* | 1/2008 | Savage | G07C 13/00 235/386 |
| 2008/0004946 A1* | 1/2008 | Schwarz | G06Q 10/10 705/12 |
| 2008/0027792 A1* | 1/2008 | Wu | G07C 13/00 705/12 |
| 2008/0222295 A1* | 9/2008 | Robinson | G06Q 10/10 709/227 |
| 2008/0275179 A1 | 11/2008 | Davis et al. | |
| 2008/0313011 A1* | 12/2008 | Rose | G06Q 30/02 705/7.32 |
| 2009/0144264 A1 | 6/2009 | Singh et al. | |
| 2010/0121857 A1* | 5/2010 | Elmore | G06F 17/30702 707/748 |
| 2010/0287011 A1* | 11/2010 | Muchkaev | A63F 13/216 379/93.13 |
| 2010/0293026 A1* | 11/2010 | Vojnovic | G06Q 99/00 705/7.13 |
| 2011/0167005 A1* | 7/2011 | Camelio | G06Q 50/188 705/80 |
| 2011/0282965 A1* | 11/2011 | Dodson | G06F 16/9535 709/217 |
| 2011/0307397 A1* | 12/2011 | Benmbarek | G06Q 50/01 705/319 |
| 2012/0005224 A1* | 1/2012 | Ahrens | G06F 16/285 707/769 |
| 2012/0179557 A1* | 7/2012 | Gross | G06Q 30/02 705/14.73 |
| 2013/0079149 A1* | 3/2013 | Fletcher | G06Q 50/01 463/42 |
| 2013/0174055 A1* | 7/2013 | Johnson | H04N 21/4758 715/753 |
| 2013/0253934 A1* | 9/2013 | Parekh | G06Q 10/107 704/258 |
| 2013/0268392 A1 | 10/2013 | Chateau-Artaud et al. | |
| 2014/0011586 A1* | 1/2014 | Vorster | G06Q 50/01 463/31 |
| 2014/0024454 A1* | 1/2014 | Patchen | A63F 13/00 463/36 |
| 2014/0181195 A1* | 6/2014 | Sullivan | H04L 63/0421 709/204 |
| 2014/0214510 A1* | 7/2014 | Karri | G06Q 30/0217 705/14.19 |
| 2014/0304042 A1* | 10/2014 | Foroutan | G06Q 10/063114 705/12 |
| 2014/0378212 A1* | 12/2014 | Sims | G06Q 30/0276 463/25 |
| 2015/0026260 A1 | 1/2015 | Worthley | |
| 2015/0058103 A1* | 2/2015 | Kirk | G06Q 30/0214 705/14.16 |
| 2015/0081449 A1* | 3/2015 | Ge | G06Q 30/0269 705/14.66 |
| 2015/0120446 A1* | 4/2015 | Judd | G06F 16/335 705/14.54 |
| 2015/0120713 A1* | 4/2015 | Kim | G06F 16/9535 707/723 |
| 2015/0199772 A1* | 7/2015 | Sherman | G06Q 30/0276 705/319 |
| 2015/0227987 A1* | 8/2015 | Kumar | G06Q 30/0282 705/319 |
| 2015/0246281 A1* | 9/2015 | Originale Di Criscio | A63F 13/798 463/31 |
| 2015/0262219 A1* | 9/2015 | Vock | H04L 67/22 705/14.41 |
| 2015/0278290 A1* | 10/2015 | Work | G06Q 30/0201 707/690 |
| 2015/0302446 A1* | 10/2015 | Park | G06Q 30/0214 705/14.16 |
| 2015/0312291 A1* | 10/2015 | Dave | G06F 40/186 715/753 |
| 2015/0381556 A1* | 12/2015 | Ahrens | G06Q 10/10 707/738 |
| 2016/0035046 A1* | 2/2016 | Gupta | H04L 67/306 705/7.29 |
| 2016/0078853 A1* | 3/2016 | Gonczi | A63F 13/42 700/92 |
| 2016/0162924 A1* | 6/2016 | Rathod | G06Q 30/0217 705/14.19 |
| 2017/0054675 A1* | 2/2017 | Tseng | G06F 3/04886 |
| 2017/0087462 A1* | 3/2017 | Eichstaedt | A63F 13/792 |
| 2017/0109839 A1* | 4/2017 | Berryman | H04L 67/22 |
| 2017/0277691 A1* | 9/2017 | Agarwal | H04L 67/22 |
| 2017/0337270 A1* | 11/2017 | Koch | G06Q 50/01 |
| 2017/0337521 A1* | 11/2017 | Godbole | G06Q 10/1095 |
| 2018/0013818 A1* | 1/2018 | Howard | H04L 67/18 |
| 2018/0013861 A1* | 1/2018 | Howard | H04L 67/36 |
| 2018/0089170 A1* | 3/2018 | Kenthapadi | G06F 16/24578 |

OTHER PUBLICATIONS

The Impact of Social Diversity and Dynamic Influence Propagation for Identifying Influencers in Social Networks, Huang et al., 2013 IEEE/WIC/ACM International Conferences on Web Intelligence (WI) and Intelligent Agent Technology (IAT).*

* cited by examiner

| ACQUIRE POINTS BY | EARNED POINTS |
|---|---|
| EVERY 10 LIKES EARNED | 5 PTS |
| EVERY RANK ADVANCED | 300 PTS |
| WATCH AN AD (FREE VERSION USERS) | 200 PTS |
| OTHER SUPPORTERS PROMOTING THEIR POST | 50 PTS |
| RECOMMEND BY OTHER USERS | 150 PTS |
| BUY PROMO POINTS PACKAGE | (SEE PACKAGE PRICES) |
| INITIAL STATING POINTS | 15000 PTS = 5 GIFTS |
| ASKED TRIVIA QUESTIONS | MAY VARY |
| REQUEST GIFTS | 100 PTS |
| ON ACHIEVEMENTS | MAY VARY |

FIG. 9

| PROMO-POINTS PACKAGE | |
|---|---|
| PACKAGE | CASH |
| 10,000 PTS | $0.55 |
| 50,000 PTS | $1.00 |
| 100,000 PTS | $1.50 |
| 200,000 PTS | $1.50 |

FIG. 10

| KEY | |
|---|---|
| POINTS | GIFT(S) |
| 1000 PTS | 1 GIFT |
| PROMOTE CONTENT | 3 GIFTS |
| REPOSTING THE SAME COMMENT | 1 GIFT |

FIG. 11

| | RANKS | RANKS | TOTAL ENDORSEMENTS |
|---|---|---|---|
| 915 | PLATINUM–CLASSIC | 6001–9000 | 9,000 |
| | PLATINUM–BRONZE | 9001–12000 | 12,000 |
| | PLATINUM–SILVER | 12001–15000 | 15,000 |
| | PLATINUM–GOLD | 15001–18000 | 18,000 |
| 920 | RUBY–CLASSIC | 18001–21000 | 21,000 |
| | RUBY–BRONZE | 21001–24000 | 24,000 |
| | RUBY–SILVER | 24001–27000 | 27,000 |
| | RUBY–GOLD | 27001–30000 | 30,000 |
| 930 | SAPPHIRE–CLASSIC | 30001–36000 | 36,000 |
| | SAPPHIRE–BRONZE | 36001–42000 | 42,000 |
| | SAPPHIRE–SILVER | 42001–48000 | 48,000 |
| | SAPPHIRE–GOLD | 48001–54000 | 54,000 |
| 940 | EMERALD–CLASSIC | 54001–60000 | 60,000 |
| | EMERALD–BRONZE | 60001–66000 | 66,000 |
| | EMERALD–SILVER | 66001–72000 | 72,000 |
| | EMERALD–GOLD | 72001–78000 | 78,000 |
| 950 | DAIMOND–CLASSIC | 78001–84000 | 84,000 |
| | DAIMOND–BRONZE | 84001–90000 | 90,000 |
| | DAIMOND–SILVER | 90001–96000 | 96,000 |
| | DAIMOND–GOLD | 96001–102000 | 102,000 |
| 960 | TOP CLASS–CLASSIC | 102001–117000 | 117,000 |
| | TOP CLASS–BRONZE | 117001–132000 | 132,000 |
| | TOP CLASS–SILVER | 132001–147000 | 147,000 |
| | TOP CLASS–GOLD | 147001–162000 | 162,000 |
| 970 | FIRST CLASS–CLASSIC | 162001–192000 | 192,000 |
| | FIRST CLASS–BRONZE | 192001–222000 | 222,000 |
| | FIRST CLASS–SILVER | 222001–252000 | 252,000 |
| | FIRST CLASS–GOLD | 252001–282000 | 282,000 |
| 980 | WORLD CLASS–CLASSIC | 282001–342000 | 342,000 |
| | WORLD CLASS–BRONZE | 342001–402000 | 402,000 |
| | WORLD CLASS–SILVER | 402001–462000 | 462,000 |
| | WORLD CLASS–GOLD | 462001–522000 | 522,000 |

FIG. 12

OVERALL CONTENT LIKES FOR EACH LEVEL

| LEVELS | STAGE 1 | STAGE 2 | STAGE 3 | STAGE 4 | STAGE 5 | STAGE 6 | STAGE 7 |
|---|---|---|---|---|---|---|---|
| 1 | 200 | 2,790 | 13,020 | 40,900 | 95,350 | 188,110 | 330,480 |
| 2 | 300 | 3,120 | 14,160 | 43,400 | 99,870 | 195,430 | 341,260 |
| 3 | 410 | 3,500 | 15,380 | 46,020 | 104,560 | 202,960 | 352,300 |
| 4 | 530 | 3,930 | 16,680 | 48,760 | 109,420 | 210,700 | 363,600 |
| 5 | 660 | 4,410 | 18,060 | 51,620 | 114,450 | 218,650 | 375,160 |
| 6 | 800 | 4,940 | 19,520 | 54,600 | 119,650 | 226,810 | 386,980 |
| 7 | 950 | 5,520 | 21,060 | 57,700 | 125,020 | 235,180 | |
| 8 | 1,110 | 6,150 | 22,680 | 60,920 | 130,560 | 243,760 | |
| 9 | 1,280 | 6,830 | 24,380 | 64,260 | 136,270 | 252,550 | |
| 10 | 1,460 | 7,560 | 26,160 | 67,720 | 142,150 | 261,550 | |
| 11 | 1,650 | 8,340 | 28,020 | 71,300 | 148,200 | 270,760 | |
| 12 | 1,850 | 9,170 | 29,960 | 75,000 | 154,420 | 280,180 | |
| 13 | 2,060 | 10,050 | 31,980 | 78,820 | 160,810 | 289,810 | |
| 14 | 2,280 | 10,980 | 34,080 | 82,760 | 167,370 | 299,650 | |
| 15 | 2,510 | 11,960 | 36,260 | 86,820 | 174,100 | 309,700 | |
| 16 | | | 38,520 | 91,000 | 181,000 | 319,960 | |

FIG. 13

SYSTEM AND METHOD FOR PROMOTING A TALENT OF A USER VIA A WIRELESS NETWORK OF MOBILE CLIENT DEVICES

FIELD OF THE INVENTION

The present invention relates generally to social networking, and more particularly to a networking system that facilitates interaction among users offering a talent and users seeking such talent.

BACKGROUND

Social networking systems have become ubiquitous. In such systems, many users post general content to news feeds that are accessible to other users. Private messaging may also be available.

Current social networking systems, however, are not targeted to specific pools of users. For example, current social networks do not provide a means for bringing specific information on talents possessed by users to others searching for such talents.

SUMMARY

One general aspect of the invention relates to a system for promoting a talent of a user. The system includes one or more application servers accessible over a wireless network, and a plurality of mobile clients configured to access the one or more application servers over the wireless network. The one or more application servers and the plurality of mobile clients cooperate to execute a profiler mode of operation in which details of talents of a plurality of profiler users are entered at respective mobile clients and uploaded to the one or more application servers, each of the plurality of profiler users having a corresponding rank stored on the one or more application servers. Further, the one or more application servers and the plurality of mobile clients cooperate to execute a supporter mode of operation in which a plurality of supporter users, using respective mobile clients, access the details of the talents and corresponding ranks of the plurality of profiler users, wherein the supporter mode of operation facilitates advancement of a profiler user to a higher rank through receipt of endorsements of the profiler user from the mobile clients of the plurality of supporter users or other profiler users, and wherein the supporter mode of operation further facilities acquisition of promotional points by a supporter user when the supporter user is recommended by another supporter user.

In one embodiment of the system, the profiler user advances to a first rank in response to receipt of a first number of endorsements, the profiler user advances to a second successive rank in response to a second number of endorsements, and the profiler user advances to a third successive rank in response to a third number of endorsements. A difference between the second number of endorsements and third number of endorsements is greater than a difference between the first number of endorsements and second number of endorsements.

In another embodiment of the system, the profiler mode of operation further includes allowing a profiler user to upload media content and/or post events for the profiler user. The uploaded media content and/or events are accessible by the plurality of mobile clients from respective profiler user and/or supporter user pages. Uploading an event for a profiler user in the profiler mode of operation may include allowing the profiler user to purchase a promotional package to promote the event, the promotional package including one or more criterion including: a targeted geographic region to promote the event to users in the targeted geographic region; a targeted age demographic to promote the event to users of a targeted age; a targeted gender to promote the event to users of the targeted gender; a duration over which the event is viewable by other users; and an RSVP criterion. In the profiler mode of operation, a profiler user can link uploaded media content files to one another to provide a larger uploaded media content file for access by other users.

In another embodiment, the profiler mode of operation and supporter mode of operation allow the plurality of mobile clients to execute a search for information relating to profiler users and supporter users. The search allows profiler users and supporter users to search for information including one or more of: a talent of one or more profiler users; a specific profiler user and/or supporter user; a specific event; an event type; and media content posted and/or re-posted by other users. When multiple profiler users meet search criteria of a search executed at a mobile client, the multiple profiler users can be displayed in rank order at the mobile client.

In other embodiments, a profiler user and a supporter user can recommend a supporter user in both the profiler mode of operation and the supporter mode of operation, wherein a number of recommendations of the supporter user are stored on one or more of application servers. The profiler mode of operation and supporter mode of operation can also allow a user to "LIKE" media content of a profiler user, wherein a profiler user advances in levels based on a number of "LIKES", and wherein the number of "LIKES" received by the profiler user is stored on the one or more application servers. The profiler user can advance to a first level in response to receipt of a first number of "LIKES", advance to a second successive level in response to a second number of "LIKES", and advance to a third successive rank in response to a third number of "LIKES". A difference between the second number of "LIKES" and third number of "LIKES" is greater than a difference between the first number of "LIKES" and the second number of "LIKES".

In other embodiments, in the supporter mode of operation, a supporter user can repost the uploaded media content and/or events of a profiler user to a supporter profile page of the supporter user. In the supporter mode of operation, the supporter user can redeem promotional points, either directly and/or indirectly, to repost the uploaded media content and/or events of the profiler user. After a first supporter user reposts the uploaded media content and/or events to a page of the first supporter user, a second supporter user can further repost the uploaded media content and/or events from a page of the first supporter user to a page of the second supporter user. A supporter user can receive "LIKES" from other supporter users, and wherein the supporter user is provided with promotional points based on a number of received "LIKES".

Another general aspect of the invention relates to a smart device for promoting a talent of a user, the smart device including software code downloadable to a memory of the smart device and executable by a processor of the smart device. The software code is executed by the processor to implement a method including: executing a profiler mode of operation for a profiler user operating the smart device, wherein details of talents of the profiler user are entered at the smart device and uploaded to one or more application servers, the profiler user having a corresponding rank stored on the one or more application servers, wherein the corresponding rank is based on a number of endorsements received by the profiler user from other system users; and executing a supporter mode of operation for a supporter user operating the smart device, wherein the details of talents and corresponding ranks of a plurality of profiler users are accessed at the smart device from the one or more application servers, wherein the supporter mode of operation allows the supporter user to endorse other profiler users to assist the other profiler users in progressing to corresponding higher ranks, and wherein the supporter mode of operation further facilities acquisition of promotional points by the supporter user when the supporter user recommends the other profiler users.

In one embodiment, execution of the profiler mode of operation further includes allowing the profiler user to upload media content and/or post events for the profiler user, wherein the uploaded media content and/or events are accessible by other system users. Uploading an event for a profiler user in the profiler mode of operation can include allowing the profiler user to purchase a promotional package to promote the event, the promotional package including one or more criterion comprising: a targeted geographic region to promote the event to users in the targeted geographic region; a targeted age demographic to promote the event to users of a targeted age; a targeted gender to promote the event to users of the targeted gender; a duration over which the event is viewable by other users; and an RSVP criterion.

In another embodiment, the profiler mode of operation and supporter mode of operation further includes allowing at least one of the supporter user and profiler user to execute a search for information relating to other profiler users and/or other supporter users. The search may allow profiler users and supporter users to search for information including one or more of: a talent of one or more profiler users; a specific profiler user and/or supporter user; a specific event; an event type; and media content posted and/or re-posted by other users. When multiple profiler users meet search criteria of a search executed using the smart device, the multiple profiler users can be displayed in rank order at the smart device.

Another general aspect of the invention is directed to a method for promoting a talent of a user in a communication network having a plurality of smart devices. The method includes: providing communication between the plurality of smart devices and one or more application servers connect to the communication network; establishing a plurality of profiler users, wherein details of talents of the plurality of profiler users are entered at respective smart devices and uploaded to the one or more application servers, the profiler user having a corresponding rank stored on the one or more application servers; establishing a plurality of supporter users having corresponding levels stored on the one or more application servers; allowing the plurality of profiler users and the plurality of supporter users to endorse the plurality of profiler users, wherein the rank of a profiler user corresponds to a number of endorsements received by the profiler user; providing promotional points to a supporter user when the supporter user recommends profiler users; and allowing the plurality of profiler users to post media and/or events to respective pages of the plurality of profiler users.

BRIEF DESCRIPTION OF THE DRAWINGS

FIG. 9 is a table showing exemplary correspondence between actions taken by a supporter and corresponding promotional points.

FIG. 10 is a table showing one example of a correspondence between a number of promotional points purchased and the amount paid for the purchase.

FIG. 11 is a table showing one example of the number of promotional points needed to purchase a gift.

FIG. 12 is a table showing how many endorsements may be required for a profiler to advance through various ranks.

FIG. 13 is a table illustrating one manner of implementing incremental level transitions.

DETAILED DESCRIPTION

Figure 1:
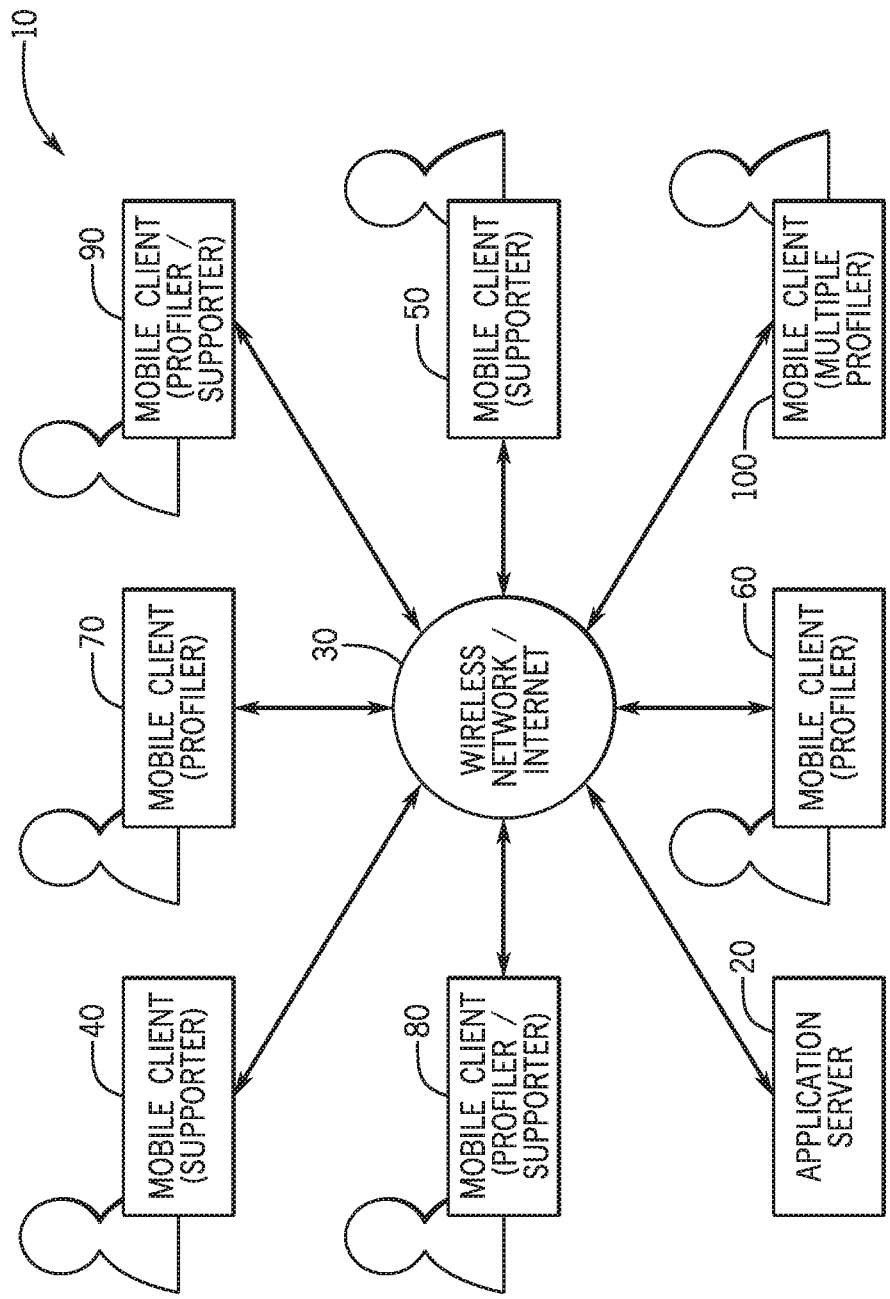
FIG. 1 is a network diagram of a system for promoting a talent of a user.

FIG. 1 is a network diagram of a system 10 for promoting a talent of a user. The system 10 includes one or more application servers 20 accessible over a wireless network 30 by a plurality of mobile clients 40, 50, 60, 70, 80, 90, 100. The plurality of mobile clients 40, 50, 60, 70, 80, 90, 100 and application servers 20 cooperate to execute a profiler mode of operation and a supporter mode of operation. Each mobile client is associated with one or more of a profiler user, a user having multiple profiler profiles, a supporter user, or combination of these users.

In FIG. 1, mobile clients 40 and 50 are solely associated with respective supporter users. Mobile clients 60 and 70 are solely associated with profiler users. Mobile clients 80 and 90 are each associated with a single respective user operating as both a profiler user and a supporter user. Mobile client 100 includes a single user having multiple profiler profiles. For these discussion, the users may have one or more of the following characteristics.

Profiler—In the profiler mode of operation, a profiler is a user that principally uses the system 10 to promote a talent, such as a service or skill. Such talents may include singing, hairstyling, garden services, music skills, magician services, or any other talent, which the profiler desires to promote. A single user may acquire multiple profiler profiles by, for example, purchasing additional profiles. Each profiler user has a corresponding rank stored on the application servers 20. Other characteristics that may be associated with a profiler user are discussed below.

Supporter—In the supporter mode of operation, a supporter is a user that accesses details of the talents and corresponding ranks of the profiler users. A supporter user may endorse profiler users to advance the ranks of profiler users.

User—In the supporter and/or profiler modes of operation, users include one or both of a profiler or supporter.

In the system 10 of FIG. 1, the mobile clients may be smart devices, such as smart phones, tablet devices, etc.

Figure 2:
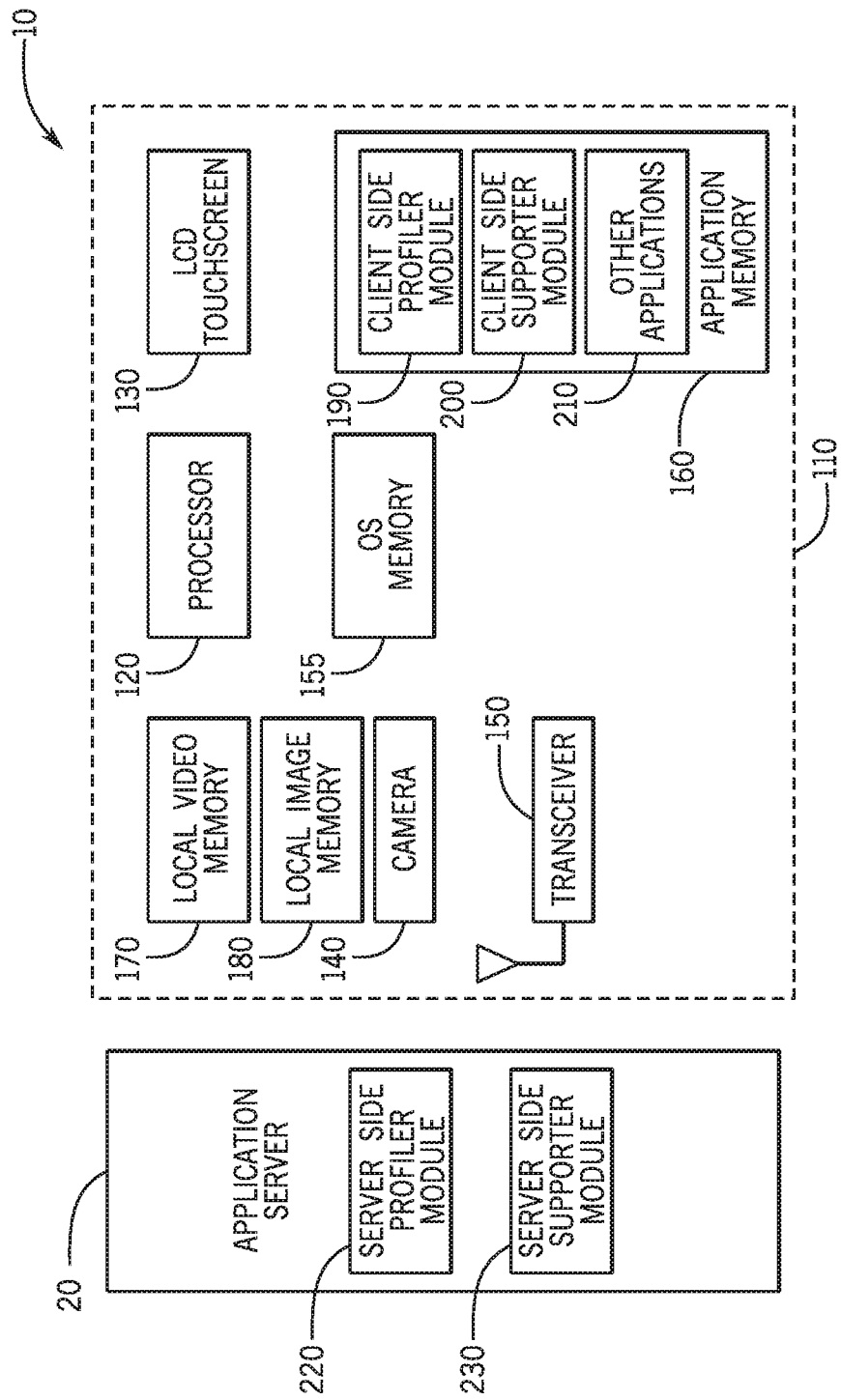
FIG. 2 is a block diagram showing an exemplary mobile client and application server that may execute the profiler and supporter modes of operation of the system.

FIG. 2 shows an exemplary mobile client 110 and application server 20 that executes the profiler and supporter modes of operation of the system 10. In this example, the mobile client 110 includes one or more processors 120 that accept user input selections from and display screens on an LCD touchscreen 130. The processor 120 may also configured to control a camera 140 to take still images and/or videos. A transceiver 150 is provided to transmit to and receive data from the Internet, including the one or more application servers 20. The application server 20 may be a cloud server, a social media server, etc.

The processor 120 is configured to access one or more local storage devices. The local storage devices may comprise a single memory component or multiple memory components used to store executable application code, executable operating system code, image data, and video data. The local storage device(s) are accessible by the processor(s).

In the example of FIG. 2, the mobile client 110 includes various functional memory storage areas. Here, the functional memory storage areas are shown as the operating system 155, the application memory 160, the local video memory 170, and the local image memory 180. The application memory 160 in this example stores a mobile application having a plurality of modules executable by the processor 120. Here, the mobile application includes a client-side profiler module 190 and a client-side supporter module 200. The application memory 160 may also include modules to execute other mobile applications 210, such as social media applications may interact with the client-side profiler module 190 and/or client-side supporter module 200.

The application server 20 is configured to communicate with the mobile clients over a wide area network, such as the Internet. In FIG. 2, the application server 20 includes a server-side profiler module 220 and a server-side supporter module 230. Together, the server-side profiler module 220, server-side supporter module 230, client-side profiler module 190, and client-side supporter module 200 cooperate with one another to execute the profiler and supporter modes of operation executed by the system 10.

Figure 3:
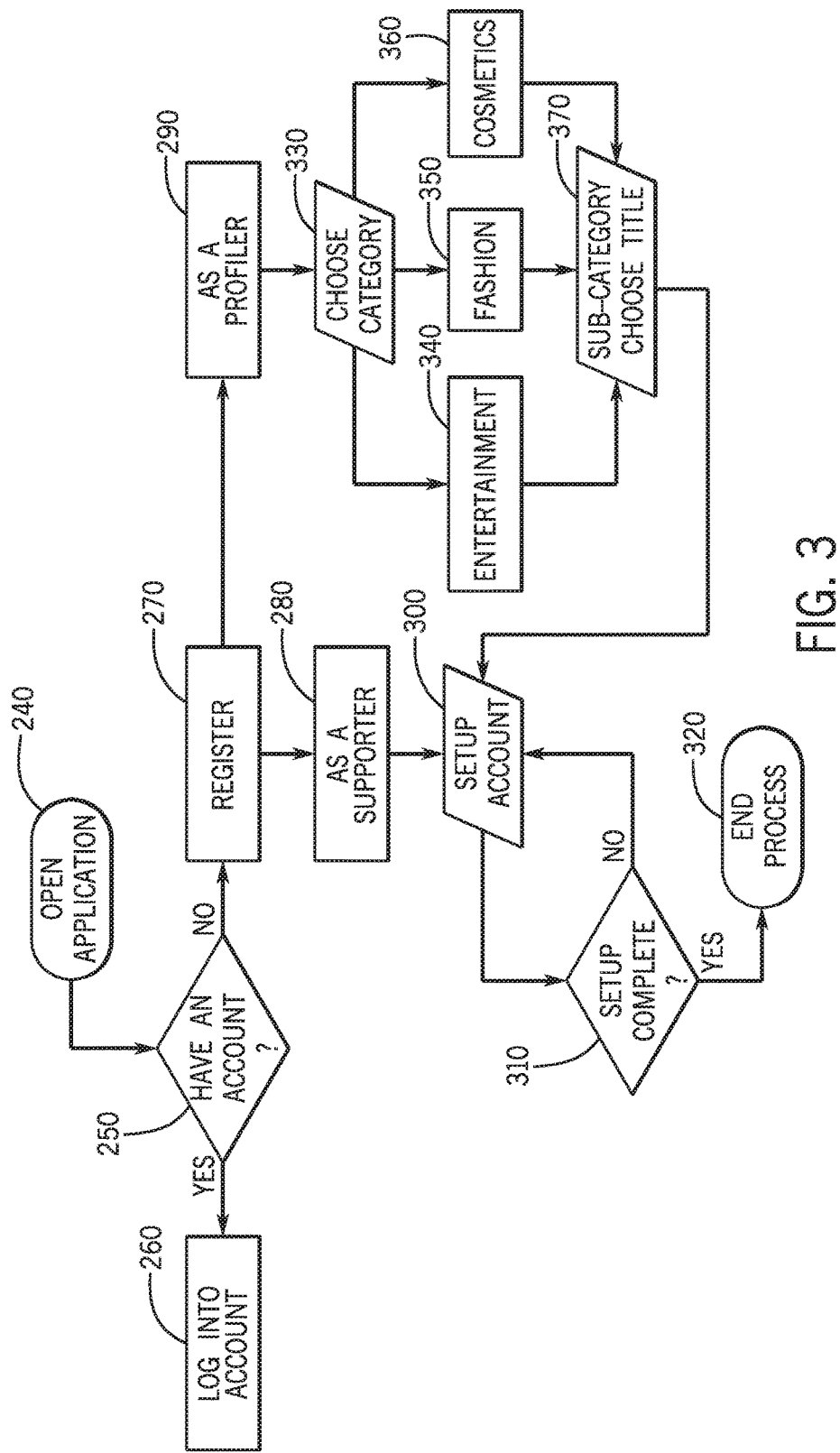
FIG. 3 is a flowchart showing one manner in which a user may establish an account on the system.

FIG. 3 is a flowchart showing one manner in which a user can establish an account on the system 10. The modules on the mobile client 110 and application server 20 cooperate to execute the account establishment procedures. Here, the application is open at operation 240 by the user on the mobile client 110. A check is made at operation 250 to determine whether the user has already established an account. If an account has been previously established for the user, the system logs the user into their account at operation 260. If an account has not been established, the user is presented with an option to register at operation 270 as either a supporter at operation 280 or a profiler at operation 290. Registration as a supporter occurs at operation 300, where the supporter enters information such as their name, address, sex, email, and the like. With set up of a supporter account complete at operation 310, the process may end at operation 320.

If the user registers as a profiler at operation 290, the user is presented with a list of categories at operation 330. The list of categories correspond to categories of talents that can be registered on the system at operation 300. In the example of FIG. 3, the list includes general categories of entertainment 340, fashion 350, and cosmetics 360. However, the list of categories may extend well beyond those shown to include other talents. Once a general category has been selected, the user can enter a sub-category relating to their talent at operation 370. The profiler enters information such as their name, address, sex, email, website address, and Facebook address at operation 300. With set up of a profiler account complete at operation 310, the process ends at operation 320. A user can establish multiple profiler accounts associated with different talents in different categories. In one example, the user purchases additional profiler accounts from within the application at the mobile client 110.

When a profiler creates an account on the system 10, a plurality of profiler pages are generated for the profiler. Among the profiler pages, one or more pages are generated as an interface through which the profiler may upload media content. The media content may be, for example, pictures, audio, video, mixed media, or the like.

Figure 4:
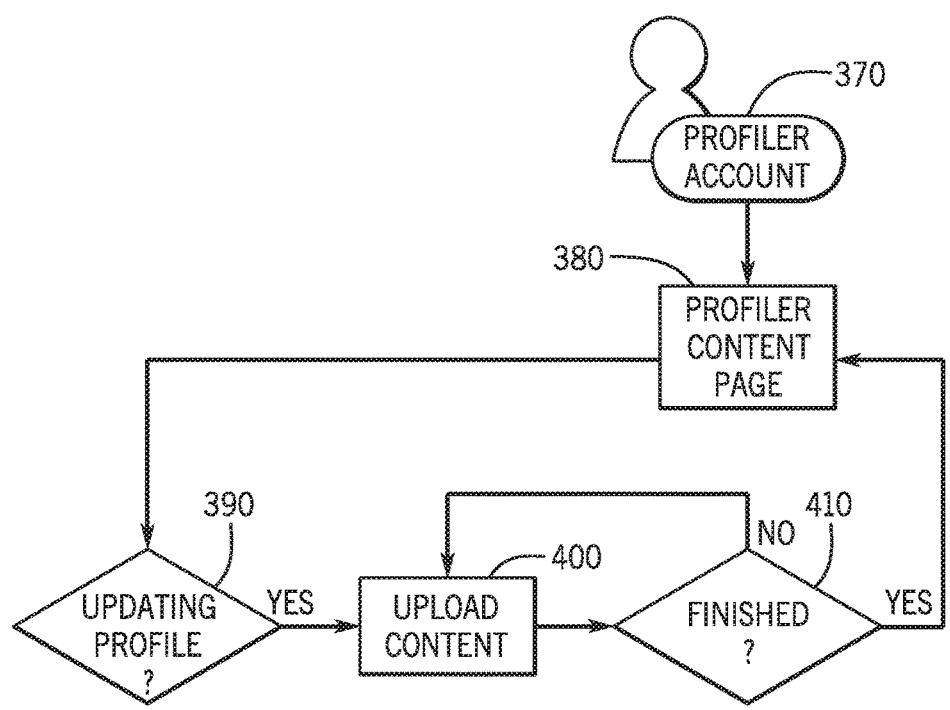
FIG. 4 is a flowchart showing one manner in which a profiler may upload content to the system.

FIG. 4 is a flowchart showing one manner in which a profiler can upload content. At operation 370, the profiler logs into their profiler account and is presented with their profiler page at 380. From there, the profiler can choose to update their profile by uploading content at operation 390. At operations 400 and 410, the profiler uploads the content before returning to the profiler profile page at 380.

The profiler may also be presented with a profiler page having an option to link the uploaded media content to generate a sequential story. For example, videos that typically last only several seconds may be linked with one another to play in sequence as a larger story video. Multiple types of uploaded media may be linked in this manner (e.g., video may be linked with pictures, pictures linked with pictures, pictures linked with video, video linked with video, etc.)

Figure 5:
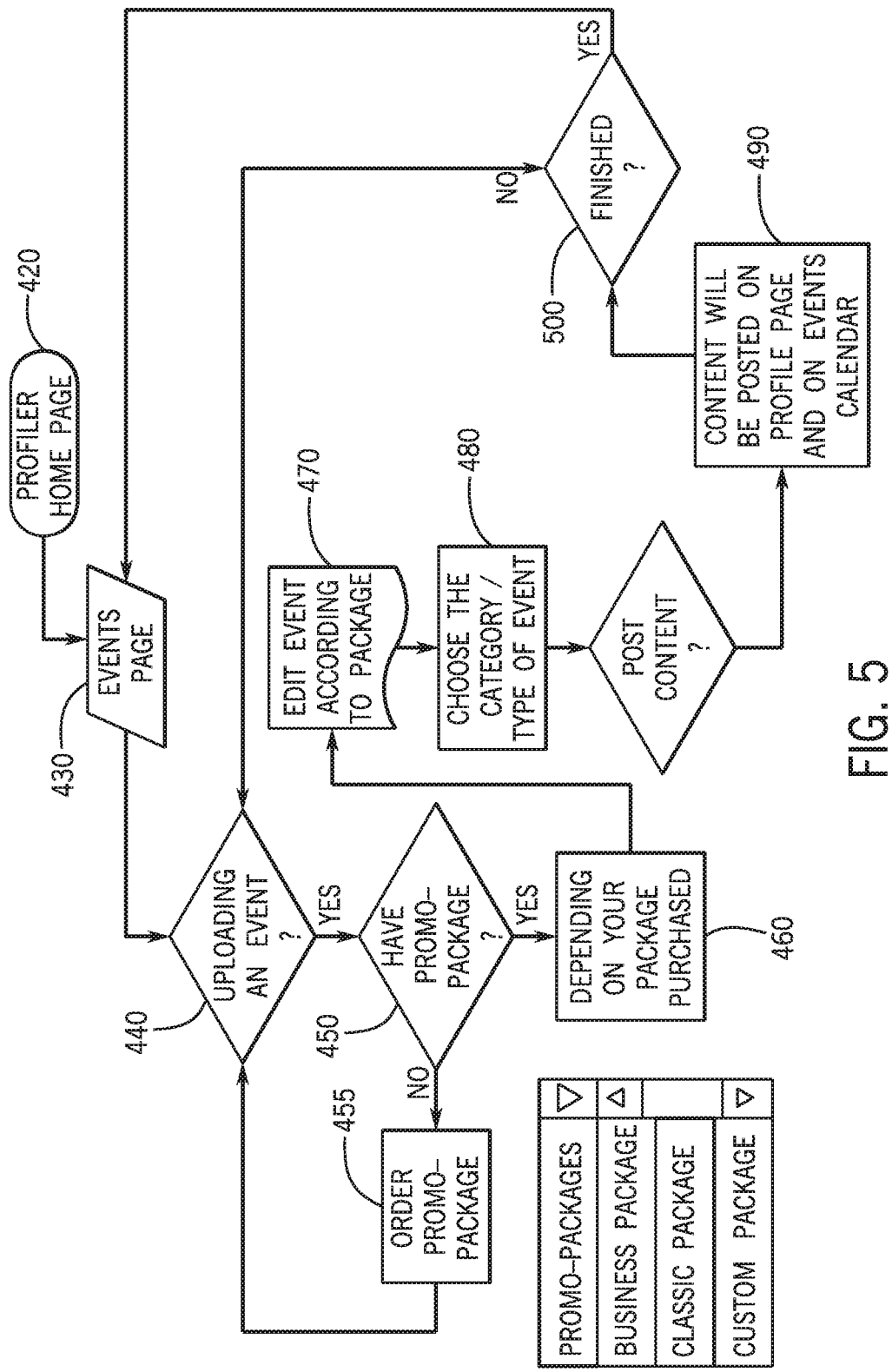
FIG. 5 is a flowchart showing one manner in which a profiler may post an event.

With reference to FIG. 5, profilers can post events (e.g., business events, community events, parties, concerts, etc.) that can be searched and accessed by other users. FIG. 5 is a flowchart showing one manner in which a profiler can post an event. As shown, the profiler logs in to the system at operation 420 and selects their events page for presentation at 430. The decision to upload an event occurs at operation 440, after which it is determined whether the profiler has an available promotional package to promote their event at operation 450. If no promotional packages are available, one or more of them may be purchased online at operation 455.

Promotional packages may be used to publicize an event and to provide interactive features. Promotional packages may include a duration over which the event is viewable by other users, RSVP criterion, event location (using, i.e., Google Maps), allowing users to buy tickets for the event, providing the profiler with a guest list, providing the profiler with a waiting list, providing users with the ability to register/sign up for the event, identification of the host of the event, providing the users with the ability to donate to support the event, contact information for the event, etc.

The promotional package can also allow the profiler to choose a specific set of one or more criterion comprising: selecting a targeted geographic region to promote the event to users in the targeted geographic region; selecting a targeted age demographic to promote the event to users of a targeted age; selecting a targeted gender to promote the event to users of the targeted gender; selecting a duration over which the event is viewable by other users; and selecting RSVP criterion. The cost of purchasing a particular promotional package may vary depending on the options selected by the profiler user.

Depending on the specific promotional package purchased at operation 455, the profiler enters the data to be used in the promotional package at operations 460 and 470. At operation 480, the profiler may choose the event category and/or event type assigned to the event. Media content for the event may also be uploaded. Among other things, the profiler data for the event is posted on the profile page of the profiler and on the events calendar of the profiler at operation 490, some or all of which can be accessed by other users. Once the events have been uploaded, the profiler is returned to their events page at operation 500. The profiler may upload another event at operation 440.

Figure 6:
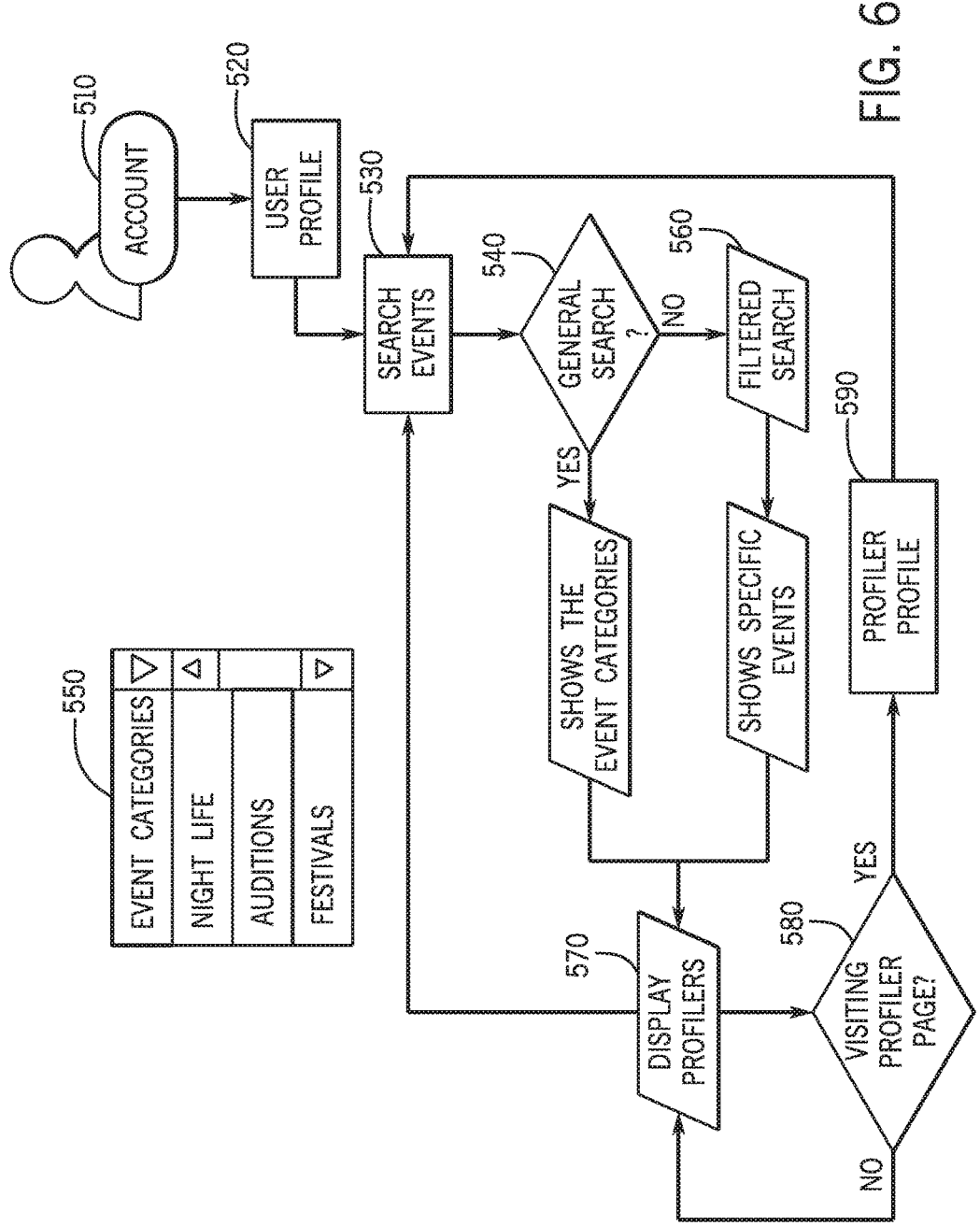
FIG. 6 is a flowchart showing one manner in which users may search for events posted by profiler.

Referring to FIG. 6, other users may search for events posted by profilers. FIG. 6 is a flowchart showing one manner in which this can be accomplished. As shown, the user logs into their account at operation 510 and is presented with their user profile page at 520. The user profile page provides an option to search events using, for example, an events search page 530. From the events search page 530, the user may elect to conduct a general search at operation 540, in which case event categories (see FIG. 3 at operation 300) are displayed in a random manner to the user for selection. In the filtered search of operation 560, the user may be provided with the ability to search on specific fields. Such fields may include, for example, event dates, event types, event venues, events associated with a specific profiler, keywords, etc. As shown here, the user may be presented with categories in a drop-down list format 550.

The results of the search are presented to the user at operation 570. When the search results are associated a filtered search and more than one profiler has been found, the results are displayed in rank order. For example, the profilers may be presented in a list, where the higher ranking profilers are listed before lower ranking profilers. The user may then select a profiler and elect to visit the profiler's profile at operation 580. In one example, the user may be directed to the specific page associated with the profiler event at operation 590. Depending on the particular promotional package selected by the profiler for the event, the user may be presented with options to RSVP, register for the event, donate to the event, buy tickets, etc. A timer may be associated with one or more of these items so it is no longer available before and/or after a predetermined time. For example, the profiler may elect to provide half-price tickets if the user RSVP's by a particular time. After that time, this particular option is no longer selectable and the user purchases their tickets at the price. In another example, the profiler may prevent a user from buying tickets before a certain time. After that time, the option to purchase their tickets at the profiler's event page may become active.

Figure 7:
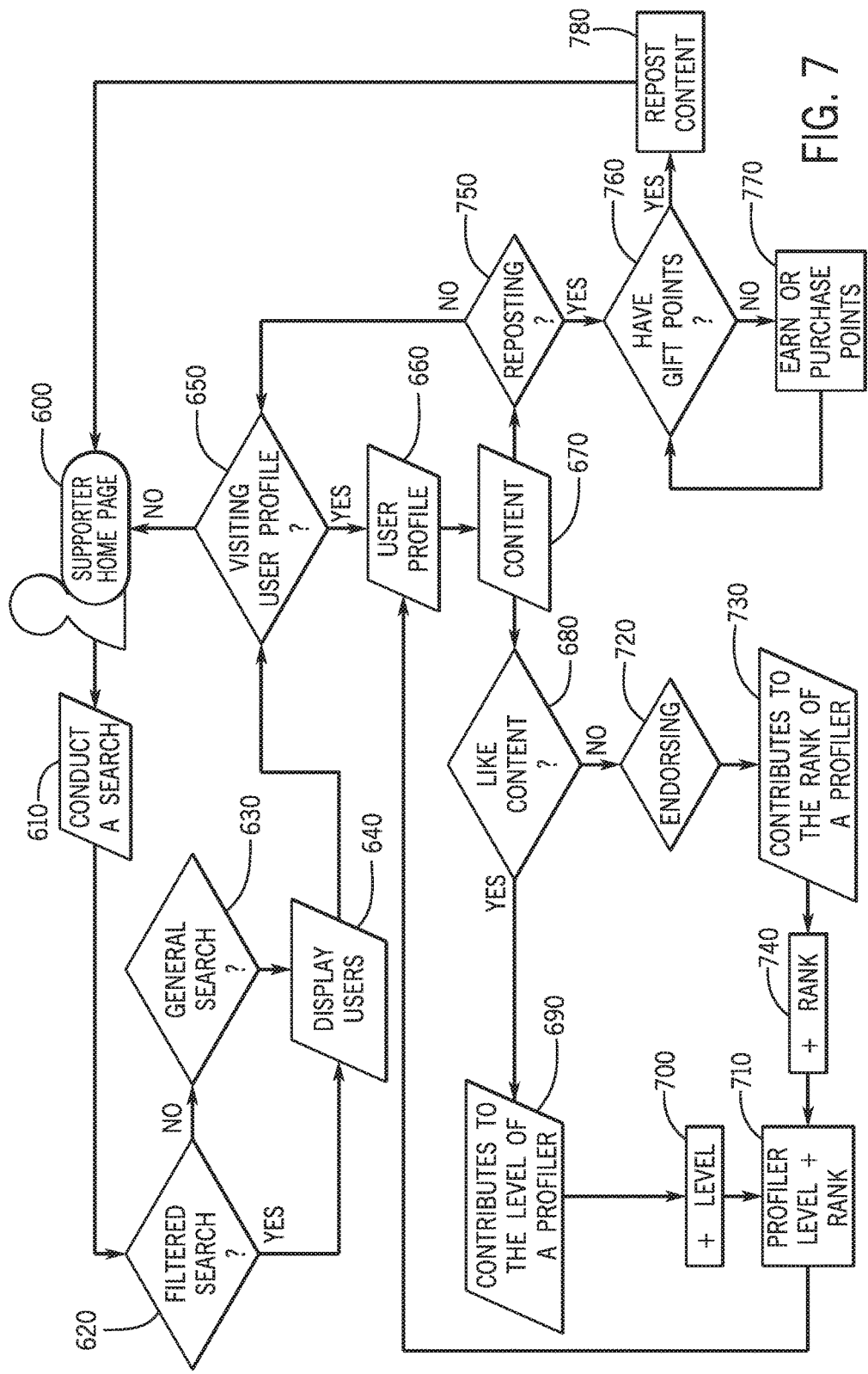
FIG. 7 is a flowchart showing one manner in which a supporter may interact with profilers.

FIG. 7 shows one manner in which a supporter may interact with profilers. Here, the user logs into their user profile at operation 600 and is presented with an option to conduct various searches at operations 610, 620, and 630. In a filtered search, the profilers falling within the search are presented in rank order at operation 640. In a general search, the profiler's are presented in random order at operation 640. The supporter may visit and access the profiler's profile page at operations 650 and 660. At operation 670, the supporter may access the content posted by the profiler. The supporter may LIKE the content at operation 680. When a supporter LIKES content, the LIKE contributes to the level of the profiler at operations 690, 700, and 710. The number of content LIKES are stored on one or more of the application servers at operation 710. Additionally, or alternatively, the supporter may endorse the profiler at operation 720. When a supporter endorses a profiler, the endorsement contributes to the rank of the profiler at operations 730, 740, and 710. The number of endorsements are stored on one or more of the application servers at operation 710. When a first supporter LIKES content of a second supporter, the second supporter receives promotional points. For example, if user A (the first supporter) recommends user B (the second supporter supporter), it is user B who gets points for the operation.

The supporter may choose to re-post content of the profiler on their own supporter profile page at operation 750. The number of promotional points/gift points available to the supporter is checked at operation 760. If the supporter does not have a sufficient number of promotional points and/or gifts, the supporter may purchase promotional points at operation 770. The promotional points are used at operation 780 to re-post the content to the supporter's profile page before returning the supporter to the supporter's profile page at operation 600. In one example, a supporter may need a certain number of points to repost the content from a profiler page. They need a total of 3000 pts which is also converted into 3 gift points. If a supporter does not have the required points or gifts, they cannot repost the content from a profiler page. If they do not have the specified amount of points to repost the content they can buy a points package from the app store.

Profilers may interact with other profilers in a manner similar to that shown in FIG. 7. However, profilers may not repost content of other profilers unless the profiler also has a supporter account from which they may interact with the other profilers. Therefore, a profiler must also have a supporter account to re-post-content of other profilers. In order to repost a content from a profiler page you have to be a supporter. This means you have to have a different account as a supporter if you are a profiler. While you can have multiple accounts (Magician & Hairstylist) as a profiler, you cannot be a supporter and a profiler under one account. This operation must be separate.

Figure 8:
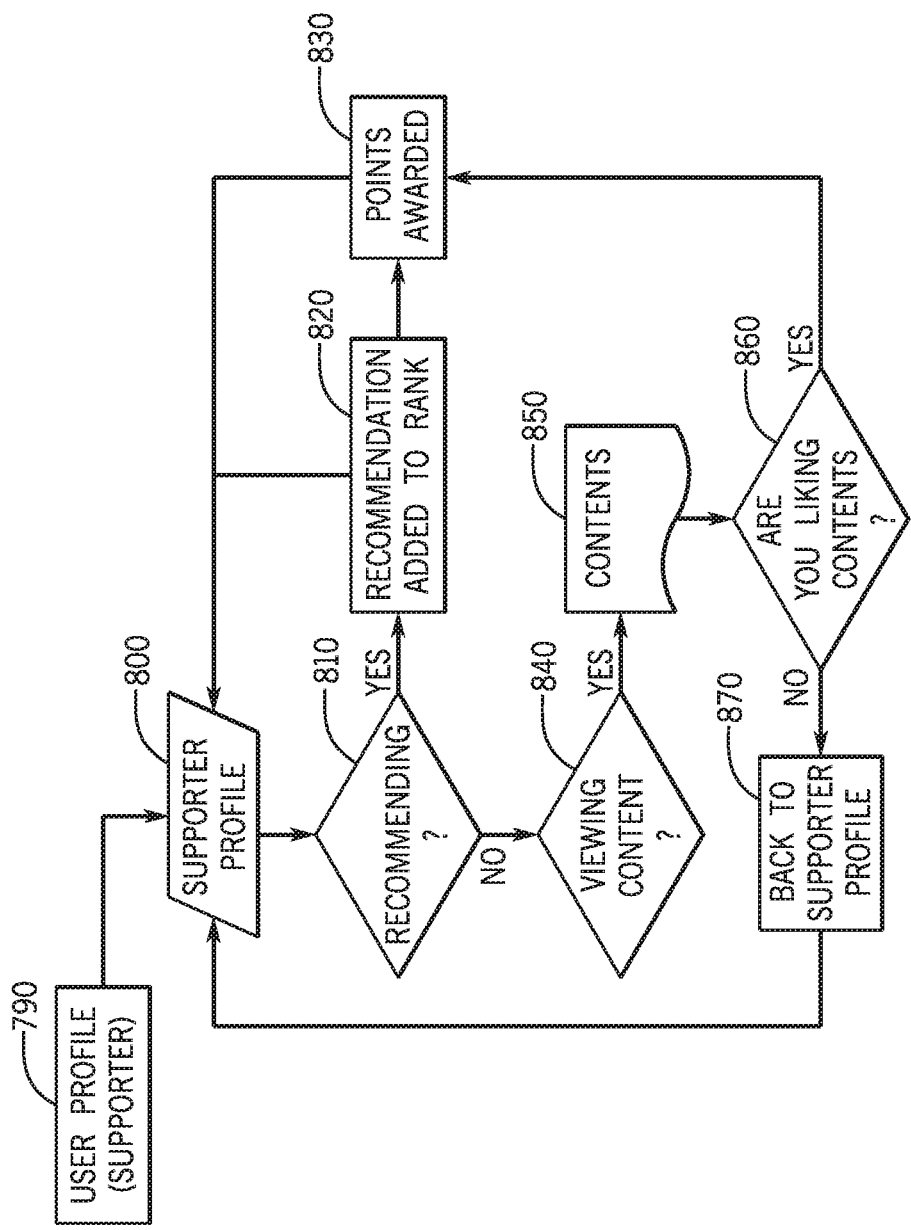
FIG. 8 is a flowchart showing one manner in which supporters may recommend other supporters and/or LIKE content that has been reposted by other supporters.

With reference to FIG. 8, supporters may recommend other supporters and/or LIKE content that has been reposted by other supporters. One manner in which this may be accomplished is shown in FIG. 8. In this example, a first supporter accesses their supporter profile at operation 790. The first supporter accesses the supporter profile of a second profiler at operation 800. The first supporter may recommend the second supporter at operation 810, which assists in increasing the rank of the second supporter at operation 820. Again, depending on the number of total LIKES received by the second supporter, a predetermined number of promotional points corresponding to the rank are awarded to the second supporter at operation 830.

The first supporter may also view content that has been re-posted by the supporter at operations 840 and 850. Re-posted content may be viewed and LIKED by the first supporter at operation 860. Depending on the total number of LIKES received by the second supporter for the re-posted content, the second supporter receives a predetermined number of promotional points at operation 830. Otherwise, the first supporter is returned to the supporter profile page of the second supporter at operation 870.

With reference to FIG. 9, supporters may obtain promotional points in several different manners. FIG. 9 is a table showing exemplary correspondence between the actions taken by a supporter and corresponding promotional points. As shown at 880, the supporter may purchase a promotional points package. FIG. 10 is a table showing one example of a correspondence between the number of promotional points purchased and the amount paid for the purchase. To this end, as shown in FIG. 10, if a supporter does not have the required points, they can purchase a points package from the app store using real money.

FIG. 11 is a table showing the conversion of points to gifts. For example, a supporter may need three Gifts (or three thousand points) to repost a profiler content. If the supporter has previously reposted the content and wishes to do a refresh of that same content, The supporter may be allowed to use a reduced number of gifts, for example, one Gift (or one thousand points) to do this operation.

Profilers may be awarded achievements that are viewable by other users. For example, the achievements may include: top entertainment profiler, top fashion profiler, top cosmetics profiler, most content LIKES in a day, most recommendations in a day, etc. These achievements may be shown to the profiler and other users on one or more of their profile pages.

Supporters may also be awarded achievements. However, unlike profilers, supporter achievements are rewarded with promotional points. Supporter achievements may include: most points earned in a week, most gifts earned, top supporter, top ranked supporter, most recommendations in a day, top recommender, etc. These achievements may be shown to the supporter on one or more of their supporter pages.

The system may operate to make it more difficult to advance through profiler ranks as the profiler receives more endorsements. For example, the profiler may advance to a first rank in response to receipt of a first number of endorsements, advance to a second successive rank in response to a second number of endorsements, and advance to a third successive rank in response to a third number of endorsements. To make it more difficult for the profiler to advance in rank, the difference between the second number of endorsements and third number of endorsements may be greater than the difference between the first number of endorsements and second number of endorsements.

FIG. 12 is a table showing how many endorsements can be required for a profiler to advance through various ranks. As shown, there are four sub-ranks in the platinum rank section 915: Platinum-classic, Platinum-bronze, Platinum-silver, and Platinum-gold. To achieve Platinum-classic, the profiler must obtain a total of six-thousand and one endorsements. Advancement between each of the sub-ranks of platinum rank section 915 is made in three-thousand endorsement increments. For example, advancement from Platinum-Classic to Platinum-Bronze requires an additional three-thousand endorsements, from six-thousand and one endorsements to nine-thousand and one endorsements. Similarly, advancement from Platinum-bronze to Platinum-silver requires an additional three-thousand endorsements over the minimum number of endorsements used to reach the Platinum-bronze rank.

The Ruby rank section 920 also includes four sub-ranks: Ruby-classic, Ruby-bronze, Ruby-silver, and Ruby-gold. Advancement between each of the sub-ranks of Ruby rank section 920 is made in three-thousand endorsement increments.

The exemplary ranks shown in FIG. 12, also include a Sapphire rank section 930, and Emerald rank section 940, and diamond rank section 950. Each of the rank sections 930, 940, and 950 include four respective sub-ranks. However, advancements between each of the sub-ranks of rank sections 930, 940, and 950 are made in six-thousand endorsement increments. Top class rank section 960 includes four respective sub-ranks. Advancements between each of the sub-ranks of Top class rank section 960 are made in fifteen-thousand endorsement increments. First class rank section 970 includes four sub-ranks. Advancements between each of the sub-ranks of the First class rank section 970 are made in thirty-thousand endorsement increments. The last rank section shown on FIG. 12 is the World class rank section 980 and includes four sub-ranks. Advancements between each of the sub-ranks of the World class rank section 980 are made in sixty-thousand endorsement increments.

The system may also operate to make it more difficult for the profiler to advance through levels as the profiler receives more content LIKES from other users. The number of LIKES may include both the LIKES received on content of the profiler's own pages as well as LIKES on the content received by supporters who have re-posted the content. One manner of implementing such level transitions is shown in FIG. 13. In this example, there are seven stages: Stages 1 through 7. Stages 1 and 2 each have fifteen levels. Stages 3, 4, and 5, each have sixteen levels. Stage 7 has six levels. The levels correspond to a respective number of content LIKES. With respect to Stage 1, the user reaches Stage 1-Level 1 when they receive two hundred LIKES. To advance from Stage 1-Level 1 to Stage 1-Level 2 the user must receive an additional one hundred LIKES, thereby reaching three hundred LIKES. To advance from Stage 1-Level 2 to Stage 1-Level 3 the user must receive an additional one hundred and ten LIKES, thereby reaching four hundred and ten LIKES. As such, these names and values are examples, and different stages, levels, and increments other than those shown in FIG. 13 may be used.

The number of LIKES required to transition between levels may also be determined using a formula. In one example the overall likes for each level, need not have a constant difference (increment) from one level to the next. Rather, the increments may have a pattern. For example, in Stage 1, each increment is 10 more than the previous increment for each level, (ex. 100, 110, 120, 130 etc.). So, if the difference of the increments is taken, it results in a constant row:

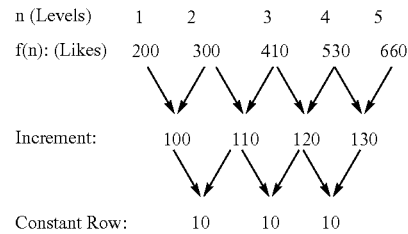

Since the difference is determined twice, the formula will be a polynomial of degree 2 (meaning that the highest exponent in this equation is 2). This is otherwise called a quadratic polynomial or a quadratic equation, and can be expressed in the general form $f(n)=an^2+bn$, where $f(n)$ is the total (in this case, it is the overall likes in each level); a, b, and c are known values, and n is the variable, which changes. Here n represents the levels. A similar formula may be used in connection with the number of recommendations used to advance through the profiler ranks.

Figure 14:
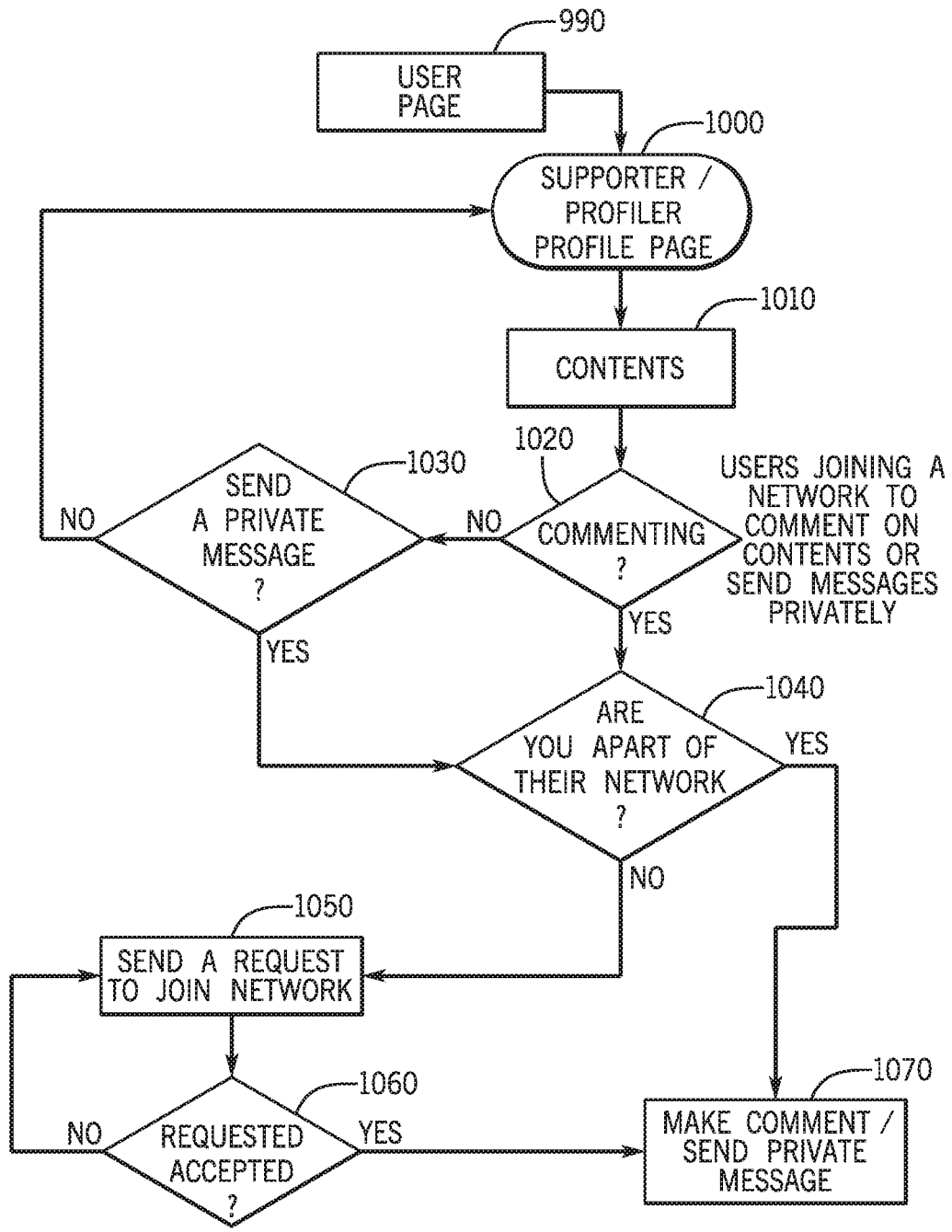
FIG. 14 is a flow chart illustrating one manner in which users may network with one another to provide comments on content and send/receive private messages.

Referring to FIG. 14, users may also network with one another in the system 10 to comment on content posted by other users and to send private messages to other users. In one example, only users who are part of the same network may provide such comments and send messages. One manner in which this may be implemented is shown FIG. 14. In this example, a first user logs into their own user profile at operation 990 and proceeds to the profile page of a second user with whom they wish to network at operation 1000. The first user may view the contents of the second user at operation 1010. Options to comment on the content and/or send a private message are provided to the first user at operations 1020 and 1030. If the first user elects to pursue one or both of operations 1020 and 1030, a check is made at operation 1040 of whether the first user is a part of the second user's network. If not, a request to join the second user's network is made at operation 1050 and may be accepted or rejected by the second user at operation 1060. If the request is accepted at operation 1060 or the first user is already part of the network of the second user, the first user may comment on the content and/or send a private message at operation 1070.

Figure 15:
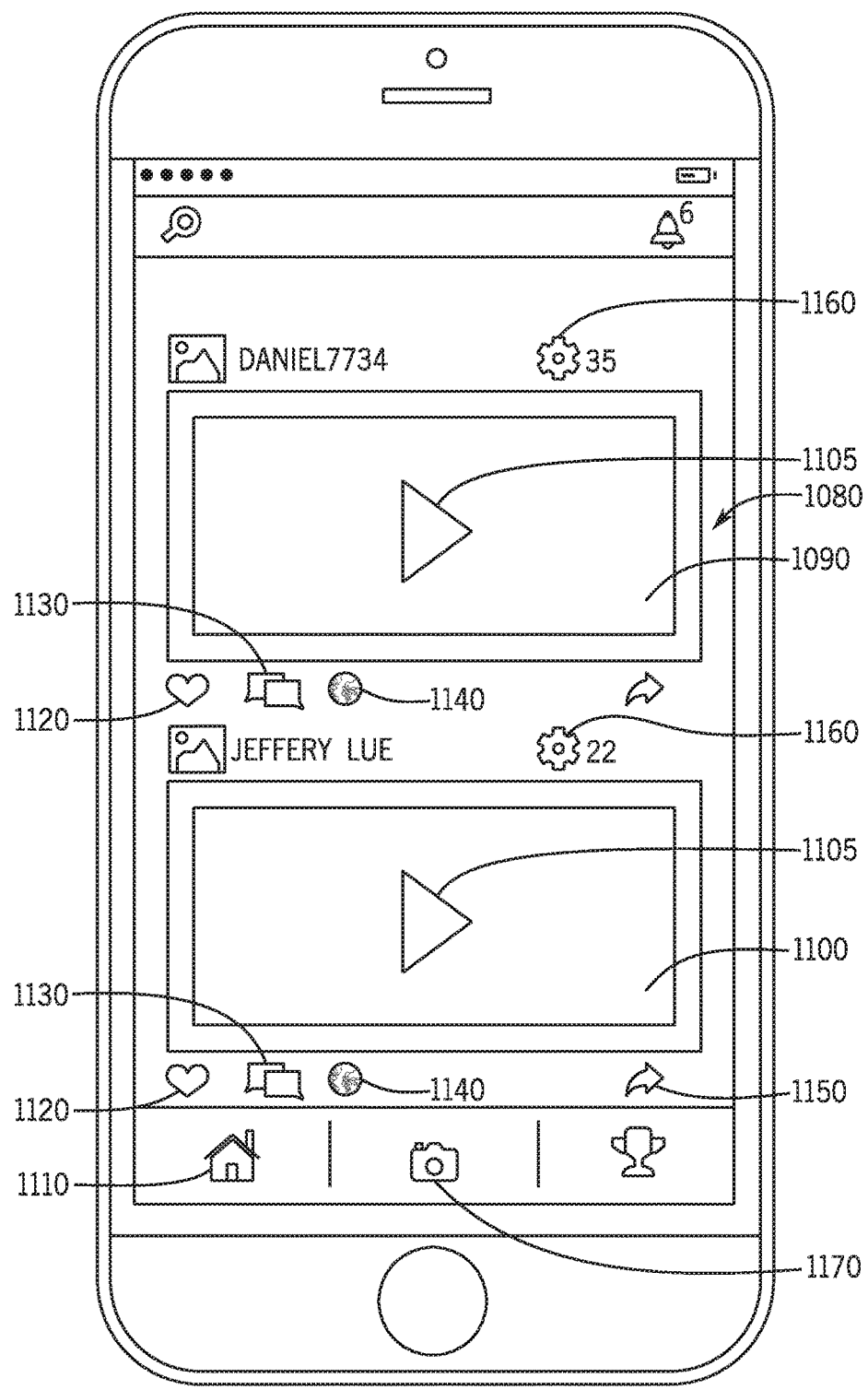
FIG. 15 is an exemplary screen shot of a home page of a user.

FIG. 15 is an exemplary screen shot of a user's home page 1080 when the mobile client is a smart phone. The home page 1080 of a user displays the latest content and/or posts made by other users that they have endorsed or recommended. The users that are displayed on the home page 1080 may be sorted by the latest date posted. The contents could be from any profiler or supporter. The specific content that is displayed depends on which users the individual has endorsed or recommended. Here, for example, the content for Daniell7734 is displayed at screen portion 1090, while the content for Jeffrey_Leu is displayed at screen portion 1100. The user may proceed to the particular profile page of either Daniell7734 or Jeffrey_Leu by actuating the screen portion proximate the name of the user and/or actuating the Play icon 1105. The user may return to their own home page 1080 from any other screen at any time by pressing the home icon 1110.

The home page 1080 for supporters and profilers are similar and have similar icons. However, the functions of some icons differ depending on whether the home page is that of a profiler or supporter.

Endorse/Like icon 1120—These icons are shown adjacent the content of each user displayed on the home page 1080. If the content is associated with that of a profiler, actuating the Endorse/Like icon 1120 acts as an endorsement of the profiler and benefits the profiler that owns the displayed content. If the user actuates this icon when the displayed content is associated with that of a supporter, actuating the Endorse/Like icon 1120 contributes to the points of the supporter associated with the displayed content.

Comments icon 1130—These icons are shown adjacent the content of each users displayed on the home page 1080. When the Comments icon 1130 is actuated, the mobile client and application servers interact to execute the operations shown in FIG. 14.

Globe icon 1140—These icons are shown adjacent the content of each user displayed on the home page 1080. The Globe icon 1140 represents other social media that the user may have attached to their profile. For example, this can be a direct link to a You Tube video or a URL for website.

Repost icon 1150—These icons are shown adjacent the content of each user that has been displayed on the home page 1080. This icon is actuated when a supporter wants to repost the content of a profiler.

Badge icon 1160—These icons are shown adjacent the content of the users that have been displayed on the home page 1080. When actuated, the Badge icon 1160 shows all the achievement that the user has acquired over a period of time within various ranks and categories.

Notification icon 1170—This icon is shown on the home page 1080 of the user and indicates whether the user has any pending notifications. These notifications may be from the user's network of supporters/profiler's, the user's achievements, the user's advancement in ranks or levels, etc.

Search icon 1180—This icon is used to initiate a search for other users, upcoming events, general and filtered searches, etc. This feature is available to both the profilers and supporters. In a general search, the search returns a random set of profilers and/or events that were identified as favorites while setting up the user account (see FIG. 3 at 300). In a filtered search, the user enters specific criterion (e.g., categories, user/profiler names, events, event types, etc.). The filtered search returns a set of profilers and/or events and sorts them in rank order.

Camera icon 1183—This icon is used on the home page 1080 of a profiler and is employed to initiate and/or record a content upload for the profiler.

Figure 16:
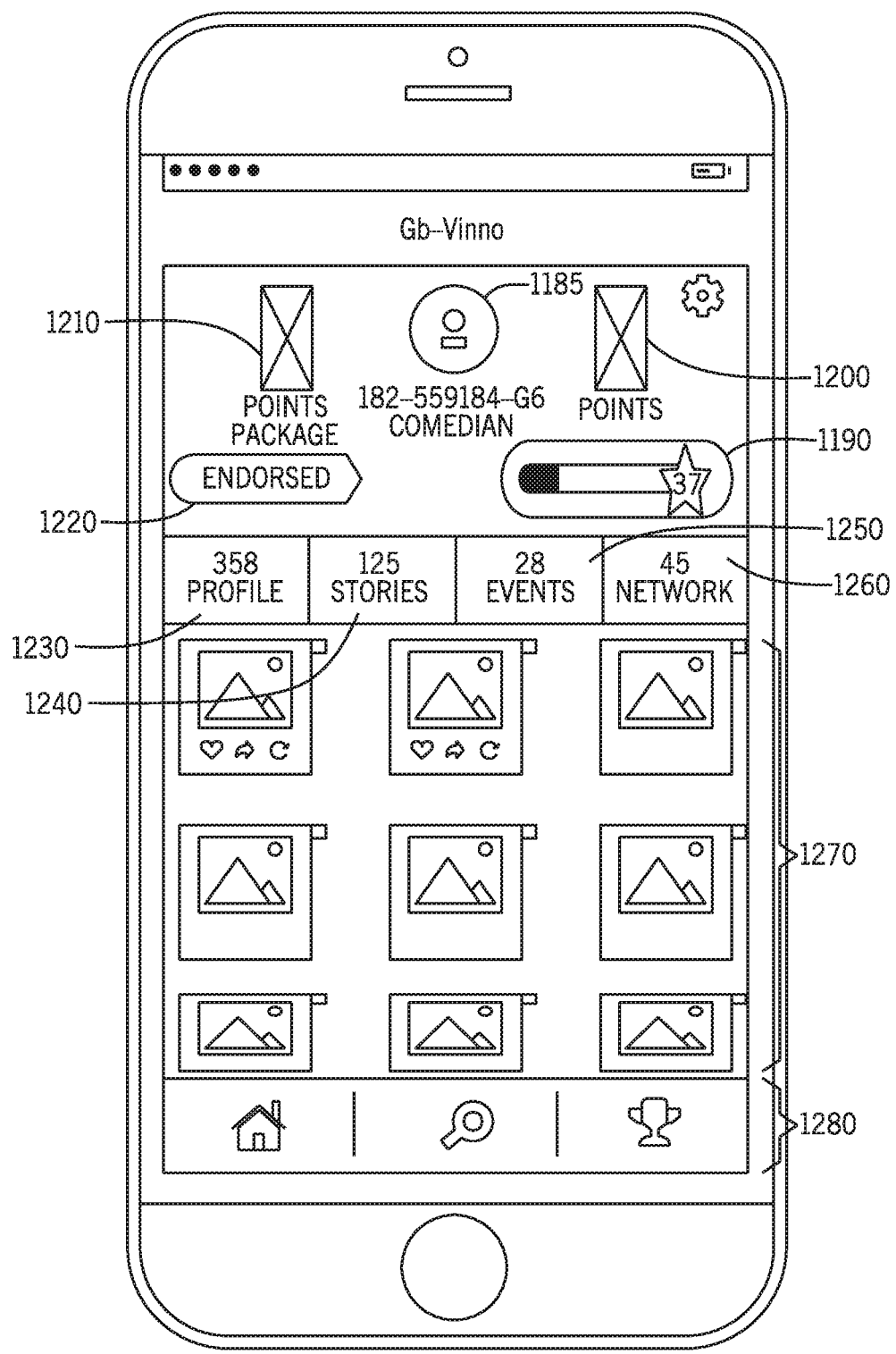
FIG. 16 is an exemplary screen shot of the profile page of a profiler that may be viewed by a user.

When a search has been completed by a user, icons corresponding to the search results are displayed to the user. Each icon represents a profiler, supporter, or event, which may be selected for further review. FIG. 16 is an exemplary screen shot of what is displayed to a user when the user has elected to proceed to the profile page of a profiler. General information relating to the profiler (e.g., their category, profile picture, etc.) is shown at screen region 1185. The level and rank of the profiler are presented to the user at screen portion 1190, where the bar represents the Level and the star represents the Rank. The number of promotional points and/or gifts available to the user is displayed at screen region 1200. Actuation of a Points package icon 1210 takes the user to the app store where they may purchase points and/or gifts. The user may endorse the profiler by actuating an Endorse icon 1220.

The information presented in display region 1270 depends on which of the tabs above the display region 1270 has been actuated. For example, profiler content may be provided when the Profile tab 1230 is selected. Story content of the profiler may be displayed when the Stories tab 1240 is selected. Events of the profiler may be displayed when the Events tab 1250 is selected. This is where others can see your booking/contact information. The offense may be color code. This information may also be used to keep an event and allow people to RSVP for it. Google maps may also be available here for instant directions to venue. The users that are part of the profiler's network may be displayed when the Network tab 1260 is selected. Screen region 1280 includes icons that are selectable by the user to return to their home page, execute a further search, view their own achievements, etc. The icons displayed in the display region 1270 when a given tab is selected, in turn, may be used access the particular content and/or information represented by the icon.

Figure 17:
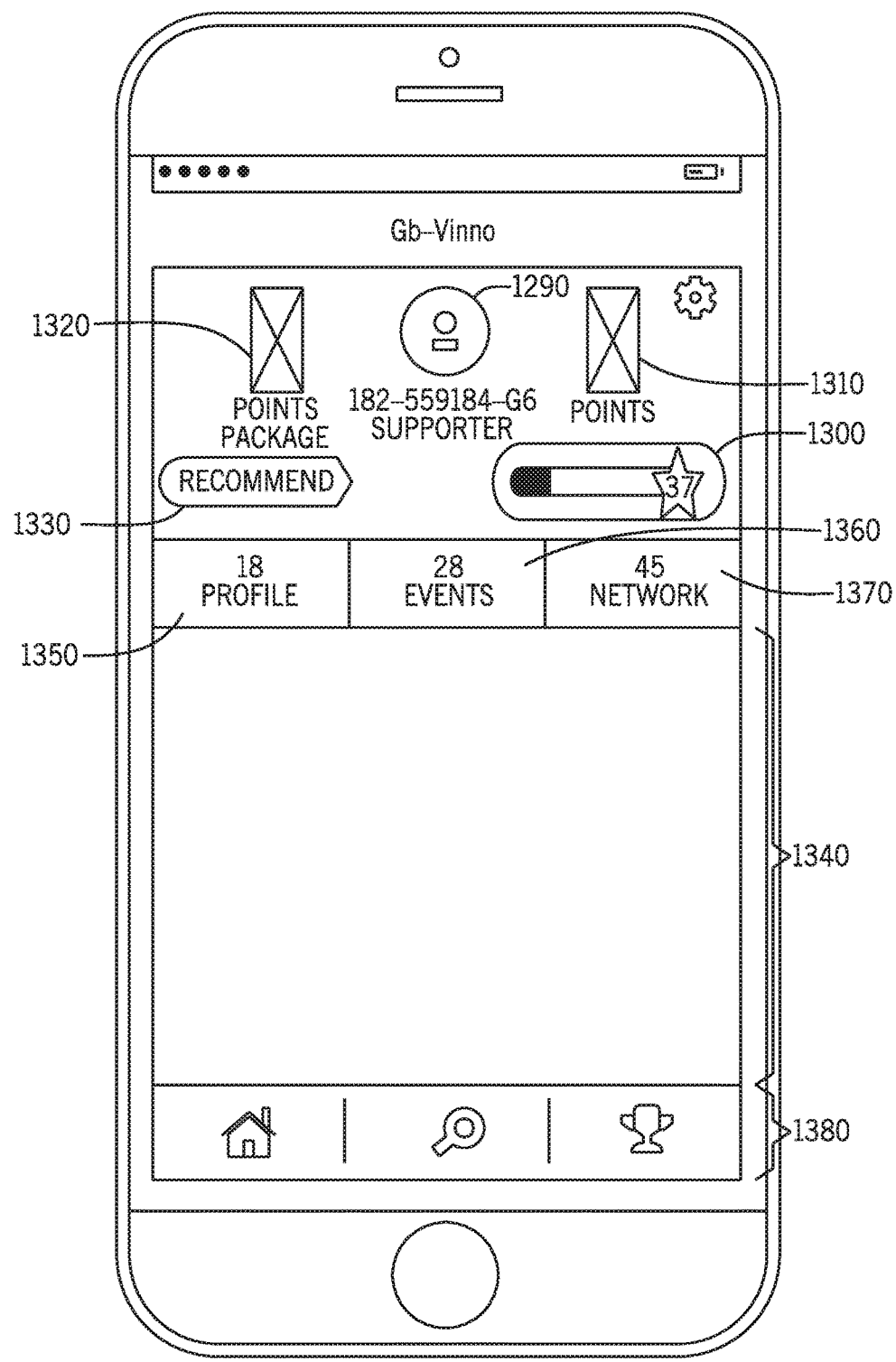
FIG. 17 is an exemplary screen shot of the profile page of a supporter that may be viewed by a user.

FIG. 17 is an exemplary screen shot of what is displayed to a user when the user has elected to proceed to the profile page of a supporter. General information relating to the supporter (e.g., their profile picture, etc.) is shown at screen region 1290. The level and rank of the supporter are presented to the user at screen portion 1300, where the bar represents the Level and the star represents the Rank. The number of promotional points and/or gifts available to the user is displayed at screen region 1310. Actuation of a Points package icon 1320 takes the user to the app store where they may purchase points and/or gifts. The user may recommend the supporter by actuating a Supporter icon 1330.

The information presented in display region 1340 depends on which of the tabs above the display region 1340 has been actuated. For example, supporter content that has been reposted and/or LIKED may be shown when the Profile tab 1350 is selected. Events which the supporter has LIKED or attending may be shown when the Events tab 1360 is selected. The users that are part of the supporter's network may be displayed when the Network tab 1370 is selected. Screen region 1380 includes icons that are selectable by the user to return to their home page, execute a further search, view their own achievements, etc. The icons displayed in the display region 1340 when a given tab is selected, in turn, may be used access the particular content and/or information represented by the icon.

In the preceding specification, specific embodiments have been described. However, it is understood that various modifications and changes can be made without departing from the scope of the claims set forth below. Accordingly, the specification and figures are to be regarded in an illustrative rather than a restrictive sense, and all such modifications are intended to be included within the scope of the present teachings.

The invention claimed is:

1. A system through which users of the system, having registered a profiler account, are each permitted to log into the system as a profiler user through an associated client to promote a talent to other users of the system, and through which users of the system, having registered a supporter account, are permitted to log into the system as a supporter user through an associated client to support efforts of profiler users to promote their talents, the system comprising:

at least one application server that includes a server-side profiler module and a server-side supporter module; and an application program configured to be executed by the associated clients, the application program including a client-side profiler module and a client-side supporter module, whereby for each profiler user logged into the system, the logged in profiler user's associated client is configured to execute the client-side profiler module in conjunction with execution of the server-side profiler module by the at least one application server to cause the system to operate in a profiler mode, the profiler mode configured to generate and display on the logged in profiler user's associated client device:

a profiler home page in conjunction a profiler user interface, and a profiler profile page when accessed through the profiler user interface, the profiler profile page configured to display media content uploaded to the application server by the logged in profiler user through the profiler user interface, and whereby for each supporter user logged into the system, the logged in supporter user's associated client is configured to execute the client-side supporter module in conjunction with execution of the server-side supporter module by the at least one application server to cause the system to operate in a supporter mode, the supporter mode configured to generate and display on the logged in supporter user's associated client:

a supporter home page in conjunction with a supporter user interface, a supporter profile page when accessed through the supporter user interface, the supporter profile page configured to display media content uploaded to the application server by the logged in supporter user through the supporter user interface, and the profiler profile page of a selected one of the profiler users when accessed through the supporter user interface by the logged in supporter, the profiler profile page receiving through the supporter user interface the supporter user's indication of endorsement of the selected one of the profiler users and/or an indication that the logged in supporter user likes at least a portion of the media content displayed on the selected profiler user's profile page, the endorsements and likes being uploaded to the at least one server and accrued for the selected profiler user to establish a rank for selected profiler user, the rank being used to order the display of profiler users by rank in response to at least searches of profiler users.

2. The system of claim 1, wherein the rank attained by each the profiler user advances to a first rank in response to accrual of a first number of endorsements and/or likes, the profiler user advancing to a second rank in response to accrual of a second number of endorsements and/or likes, the profiler user advancing to a third rank in response to accrual of a third number of endorsements and/or likes, a difference between the second number of endorsements and/or likes and third number of endorsements and/or likes being greater than the difference between the first number of endorsements and/or likes and the second number of endorsements and/or likes.

3. The system of claim 1, wherein the profiler mode is further configured to generate and display on the logged in profiler user's associated client:

a default listing, as part of the logged in profiler user's home page, of at least some of the other profiler users of the system in descending order of their rank, the default listing including profiler users that have been endorsed by the logged in profiler user, the default listing including at least a portion of the profile information of each of the listed profiler users, the home page of one of the listed profiler users, when selected by the logged in profiler user through the profiler user interface, including a portion of the profiler user interface for receiving and uploading from the logged in profiler user to the at least one application server for storage, an endorsement of the selected one of the listed profiler users and/or an indication that the logged in supporter user likes at least a portion of media content displayed on the selected profiler user's home page, the accrued endorsements and likes for the selected profiler user accruing to the rank of the selected profiler user.

4. The system of claim 3, wherein the profiler mode is further configured to generate and display on the profiler user's associated client:

a search portion of the profiler user interface through which the logged in profiler user can perform filtered searches that generate and display search listings of profiler users in ranked order, and generating an events page through which the logged in profiler user can upload one or more events.

5. The system of claim 1, wherein the profiler user interface permits the logged in profiler user to link uploaded media content files to one another.

6. The system of claim 4, wherein the search portion of the profiler user interface accepts filtered search criteria including one or more of:

a talent of one or more profiler users;

a specific profiler user and/or supporter user;

a specific event;

an event type; and media content posted and/or re-posted by other users.

7. The system of claim 1, wherein the profiler mode is further configured to permit the logged in supporter user to upload content from the selected profiler user's profile page to the logged in supporter user's profile page through the supporter user interface.

8. The system of claim 7, wherein in the supporter mode of operation, after a first supporter user reposts the uploaded media content and/or events to a page of the first supporter user, a second supporter user can further repost the uploaded media content and/or events from a page of the first supporter user to a page of the second supporter user.

9. The system of claim 1, wherein the supporter mode is further configured to generate and display on the logged in supporter user's associated client:

a default listing, as part of the logged in supporter user's home page, of at least some of the profiler users of the system in descending order of their rank, the default listing including profiler users that have been endorsed by the logged in supporter user, the default listing including at least a portion of the profile information of each of the listed profiler users, and the home page of one of the listed profiler users, when selected by the logged in supporter user through the supporter user interface, including a portion of the supporter user interface for receiving and uploading from the logged in supporter user to the at least one application server for storage, an endorsement of the selected one of the listed profiler users and/or an indication that the logged in supporter user likes at least a portion of media content displayed on the selected profiler user's home page, the accrued endorsements and likes for the selected profiler user accruing to the rank of the selected profiler user.

10. The system of claim 4, wherein the supporter mode is further configured to generate and display on the supporter user's associated client:

a search portion of the supporter user interface through which the logged in supporter user can perform filtered searches that generate and display search listings of profiler users in ranked order, and a portion of the supporter user interface through which the logged in supporter user can view and purchase admission to events of a selected one of the listed profiler users.

11. The system of claim 10, wherein the search portion of the supporter user interface accepts filtered search criteria including one or more of:

a talent of one or more profiler users;

a specific profiler user and/or supporter user;

a specific event;

an event type; and media content posted and/or re-posted by other users.

12. The system of claim 1, wherein the supporter mode is further configured to generate, when the profile page of the selected profiler is being displayed on the logged in supporter user's associated client, a portion of the supporter user interface configured to receive comments of the logged in supporter user regarding media content displayed on the selected profiler's profile page.

13. The system of claim 12, wherein:

the supporter mode is further configured to generate a portion of the supporter user interface configured to receive a request from the logged in supporter user to join a network of the selected profiler user if not already a member, and the logged in supporter user is only permitted to upload comments regarding the content of the selected profiler user when the request is accepted by the selected profiler user making the logged in supporter user a user member of the network.

14. The system of claim 13, wherein the supporter mode is further configured to generate, when the profile page of the selected profiler is being displayed on the logged in supporter user's associated client, a portion of the supporter user interface configured to receive private messages of the logged in supporter user to other member users of the selected profiler's network.

15. The system of claim 1, wherein the profiler mode is further configured to generate, when the profile page of the selected one of the other profilers is being displayed on the logged in profiler user's associated client, a portion of the profiler user interface configured to receive comments of the logged in profiler user regarding media content displayed on the selected profiler's profile page.

16. The system of claim 15, wherein:

the profiler mode is further configured to generate a portion of the profiler user interface configured to receive a request from the logged in profiler user to join a network of the selected profiler user if not already a member, and the logged in profiler user is only permitted to upload comments regarding the uploaded content of the selected profiler user when the request is accepted by the selected profiler user making the logged in profiler user a user member of the network.

17. The system of claim 16, wherein the profiler mode is further configured to generate, when the profile page of the selected profiler is being displayed on the logged in supporter user's associated client, a portion of the profiler user interface configured to receive private messages of the logged in profiler user to other member users of the selected profiler's network.

* * * * *